United States Patent

Zubryckyj et al.

[15] 3,640,706
[45] Feb. 8, 1972

[54] METHOD FOR RECOVERING SUBSTANTIALLY PURE NICKEL FROM AMMONIACAL NICKEL AMMONIUM CARBONATE LEACH SOLUTIONS

[72] Inventors: Nicolas Zubryckyj, Praca Roamos de Azewedo 254, Sao Paulo, Brazil; Vladimir Nicolaus Mackiw, 9 Blair Athol Crescent, Islington, Ontario; Donald Robert Weir, 10228 109th Street, Fort Saskatchewan, Alberta, both of Canada

[22] Filed: Feb. 20, 1970

[21] Appl. No.: 13,191

[52] U.S. Cl. ............................................. 75/103, 75/119
[51] Int. Cl. ................................................. C22b 23/04
[58] Field of Search .............................. 75/119, 103; 23/61

[56] References Cited

UNITED STATES PATENTS 3,088,803   5/1963   Mackiw et al. ...................... 75/119 X
3,141,765   7/1964   Brown et al. ......................... 75/103

Primary Examiner—L. Dewayne Rutledge
Assistant Examiner—G. T. Ozaki
Attorney—Frank I. Piper and Arne I. Fors

[57] ABSTRACT

Nickel is recovered in pure elemental form from ammoniacal nickel ammonium carbonate leach liquors containing sulphur and other impurities including magnesium and silica. The liquor is first heated to precipitate nickel as impure basic nickel carbonate. The precipitate is redissolved in two stages in pure ammoniacal ammonium carbonate solution and undissolved solids, which contain the magnesium, silica and other impurities, are separated from the solution. The solution is then heated to reprecipitate nickel as basic nickel carbonate. Sulphur contaminants are converted to sulphate form by reacting the system, either before or after the reprecipitation step, with oxygen gas. The slurry from the reprecipitation step is then reacted directly with hydrogen at elevated temperature and pressure to produce pure nickel powder.

5 Claims, No Drawings

METHOD FOR RECOVERING SUBSTANTIALLY PURE NICKEL FROM AMMONIACAL NICKEL AMMONIUM CARBONATE LEACH SOLUTIONS

BACKGROUND OF THE INVENTION

This invention relates to a method for recovering substantially pure nickel from nickel bearing aqueous ammoniacal ammonium carbonate leach liquors containing sulphur and other nonmetallic and metallic impurities.

It is known to treat nickel- and cobalt-bearing lateritic ores, such as occur in Cuba and the Philippines, for example, by first roasting the ore under reducing conditions to selectively reduce nickel and cobalt oxides in the material to crude metallic state and then leaching the reduced material with ammoniacal ammonium carbonate solution under oxidizing conditions to extract the nickel and cobalt.

Conventionally, the nickel and cobalt are recovered from leach liquors obtained in this manner simply by boiling the solution to drive off ammonia and carbon dioxide to precipitate dissolved nickel and cobalt in the form of basic carbonate compounds. The precipitate is then heated to convert it to a mixed nickel-cobalt oxide product.

It is also known to treat the leach solution to selectively remove the cobalt and copper prior to the boiling step in order to produce basic nickel carbonate precipitate substantially free from contamination by these metals.

An alternative procedure which has been recently proposed and which has the advantage of enabling recovery of the nickel in metallic form is to reduce cobalt- and copper-free basic nickel carbonate precipitate directly to elemental nickel by reacting a suspension of the basic nickel carbonate in aqueous ammoniacal ammonium carbonate solution with hydrogen at elevated temperature and pressure. However, like the nickel oxide obtained by the more conventional procedures, the product nickel metal is contaminated with sulphur and other impurities such as magnesium, silica and aluminum which normally are present in basic nickel carbonate precipitated from leach solutions derived from leaching reduced lateritic ores.

Laterites normally contain around 0.1 to 0.2 percent by weight sulphur which is not removed by reduction roasting. During leaching with aqueous ammoniacal ammonium carbonate solution, the largest part of this sulphur is solubilized. It is common, for example, to obtain a leach solution containing 10-15 g.p.l. nickel and 1 g.p.l. sulphur. The final nickel product derived from direct hydrogen reduction of basic nickel carbonate precipitated from such a solution will have a sulphur content well in excess of 0.02 percent by weight which is a commercially acceptable maximum level for pure nickel. The sulphur occurs in the nickel product in sulphide form and it can be removed or lowered to acceptable levels only by costly procedures involving sintering the product at elevated temperature in a flowing hydrogen atmosphere.

In addition to sulphur, reduced lateritic ores normally contain various amounts of other metal and nonmetal values including iron, manganese, magnesium, silica, aluminum and calcium which tend to contaminate the leach solution. Iron and manganese go into solution in a low valent form and are then oxidized during the leach to the ferric and manganic state. In this state they form compounds which are insoluble in ammonia-ammonium carbonate solution. However, normally small amounts of iron and manganese are not oxidized and remain in the solution. Also, the other impurities, such as magnesium and silica, are not oxidized to insoluble form during the oxidation leach. These impurities tend to precipitate with the basic nickel carbonate, thereby contaminating it and the nickel product obtained therefrom.

SUMMARY OF THE INVENTION

The present invention provides a method whereby nickel can be readily recovered in substantially pure elemental form from ammoniacal nickel ammonium carbonate leach solution from which cobalt and copper have been stripped but which contain sulphur and other impurities including magnesium and silica. According to the invention, the nickel is so recovered by first heating the solution to drive off ammonia and carbon dioxide to precipitate nickel from solution as basic nickel carbonate. The basic nickel carbonate precipitate is separated from the leach solution and is redissolved in a substantially pure aqueous ammoniacal ammonium carbonate solution to provide a more concentrated nickel ammine carbonate solution. The undissolved solids, which contain magnesium, silica and other impurities as well as any iron and manganese values not oxidized to insoluble form in the leach, are separated from the resulting concentrated solution and the solids-free solution is heated to reprecipitate the nickel as basic nickel carbonate. The resulting slurry is contacted with a free-oxygen-bearing gas under a partial pressure of oxygen above about 5 p.s.i. and at a temperature within the range of 150° to 500° F. for a time sufficient to oxidize substantially all sulphur values in the suspension to sulphate form. The slurry is then reacted with hydrogen at elevated temperature and pressure to produce substantially pure elemental nickel product.

According to an alternative form of the invention, oxidation of the sulphur values to sulphate form may be effected by contacting the concentrated nickel ammine carbonate solution with free oxygen gas after the separation of the undissolved solids but before the reprecipitation step.

According to another modification of the invention, where the sulphur contamination in the basic nickel carbonate precipitate derived from the leach solution is relatively high, in the order of 1 percent by weight or more, an additional step is provided in which the precipitate is contacted with a solution of a soluble sodium compound capable of combining with sulphate ions to form sodium sulphate. Sodium sulphate formed in this step is separated from the basic nickel carbonate precipitate and the precipitate is then treated as previously stated.

According to still another modification of the invention, where sulphur contamination in the basic nickel carbonate is relatively high, instead of the soluble sodium compound treatment referred to in the preceding paragraph, the leach solution is treated with a small amount of a sulphiding agent such as $H_2S$ after precipitation and separation of the initial basic nickel carbonate precipitate. This treatment ensures that substantially all nickel is removed from the leach solution by precipitating, as nickel sulphide, any nickel that may be tied up with the sulphur contaminants.

The process of the invention effectively permits the recovery of elemental nickel having a sulphur content well below 0.02 percent by weight and usually below 0.005 percent by weight. Undesirable sulphur contamination in the product is eliminated by ensuring that all sulphur impurities present in the slurry treated in the reduction step are oxidized to sulphate form. This minimizes the amount of sulphur that precipitates with the nickel product. Also, where the initial sulphur content of the basic nickel carbonate precipitated from the leach solution is higher than about 1 percent by weight, the treatment with a sodium compound or sulphiding agent ensures that substantially all nickel values are recovered from the starting solution.

The other impurities such as magnesium, silica, aluminum, calcium and the like are removed from the system in the basic nickel carbonate redissolution step in that the basic nickel carbonate is substantially completely dissolved in fresh ammoniacal ammonium carbonate solution while the impurities are relatively insoluble and remain in the undissolved residue.

The method of the present invention is applicable to any ammoniacal ammonium carbonate solution which is substantially cobalt and copper free and contains nickel and undesirable contaminants including particularly sulphur, magnesium and silica. However, the process will normally be used in conjunction with a reduction-ammonium carbonate leach process for recovering nickel from nickeliferous laterites, and it will therefore be described and illustrated hereinbelow as so used.

DESCRIPTION OF THE PREFERRED EMBODIMENTS

According to a preferred form of the aforesaid process, the ore is dried, sized and/or ground as required, then fed to a furnace wherein it is reacted under controlled conditions with reductants, such as coal or producer gas to reduce the nickel and cobalt oxides to metallic form with a minimum accompanying reduction of iron oxide to metallic state.

The calcined ore is leached with aqueous ammoniacal ammonium carbonate solution under oxidizing conditions to obtain maximum extraction of nickel and cobalt. Leaching is conducted at ambient temperatures in the presence of free oxygen which is provided, for example, by sparging air into the leach vessel. Leaching preferably is continued to obtain optimum dissolution of nickel and cobalt regardless of the amount of carbonate forming impurities such as magnesium which may be dissolved in the leach solution. Because of the relatively low nickel content of the reduced ore and the practical necessity of conducting the leaching operation with a pulp density within a range (usually 30–40 percent by weight solids) that permits efficient leaching, leach solution generally is recycled as required to build up the nickel content to 8–15 g.p.l. at which level the solution can be economically processed further for the recovery of nickel.

The leach solution is separated from leach residue such as by thickening and filtration. Cobalt and copper are stripped from the recovered leach and the recycle solutions by reacting them with a sulphidizing agent such as $H_2S$, $(NH_4)_2S$, $Na_2S$ or NaHS to precipitate the cobalt and copper, together with a small amount of nickel, as a mixed cobalt-nickel-copper sulphide.

The product liquor from the leaching operation therefore is a substantially cobalt- and copper-free ammoniacal nickel ammonium carbonate solution containing about 8 to 15 grams per liter nickel. The solution also contains sulphur, other impurities such as magnesium, aluminum and silica and, in most cases, small amounts of iron and manganese.

According to the present invention, nickel is recovered from such impure leach solutions in elemental form substantially free from impurities. Firstly, the solution is treated in a boiling or distilling step to drive off ammonia and carbon dioxide to precipitate substantially all the dissolved nickel as basic nickel carbonate. In this operation, most of the sulphur and other impurities precipitate with the basic nickel carbonate. It has been found that normally the sulphur is present in the leach solution partly in sulphate form and partly in the form of unsaturated sulphur compounds such as thiosulphates ($S_2O_3^{--}$) and polythionates (e.g., $S_3O_6^{--}$). During the boiling operation, sulphate sulphur precipitates in combination with nickel and, to a lesser extent, with iron and manganese, when these metals are present, as basic sulphate compounds. Unsaturated sulphur compounds are adsorbed by the basic nickel carbonate precipitate and, therefore, are also precipitated.

Where the amount of sulphur in basic nickel carbonate precipitate is relatively high, e.g., in excess of 1 percent by weight, preferably the sulphur in sulphate form is removed from the system. If excess sulphur is not removed, there is a tendency for some nickel values to remain in solution during the initial basic nickel carbonate precipitation step with the result that these values are lost with the end solution from the first boil. The excess sulphur removal operation preferably is carried out by simply providing a sodium compound capable of combining with sulphate ions to form sodium sulphate in the leach solution prior to the first boiling step. The sodium compound ties up available sulphate ions in the solution thus preventing the formation of basic nickel, iron and/or manganese sulphates. The preferred sodium compound for this operation is sodium carbonate, although other sodium compounds, such as sodium hydroxide and/or sodium bicarbonate, may also be used. In any case, the amount of sodium compound required in the solution is relatively small—in the order of 2–20 grams per liter.

As an alternative to the sodium compound addition procedure just mentioned, losses of nickel values to the first boil end solution can be prevented by contacting the solution, after separation of the initial basic nickel carbonate precipitate, with a small amount of a sulphiding agent, such as $H_2S$, $(NH_4)_2S$, $Na_2S$ or NaHS, to precipitate any residual nickel values in the end solution as nickel sulphide. The nickel sulphide so precipitated is then separated from the first boil end solution and is either recycled to the reduced ore leaching step or is combined with the mixed sulphide precipitate from the cobalt-copper removal step.

The basic nickel carbonate from the first boiling step is redissolved in a substantially pure aqueous ammoniacal ammonium carbonate solution to produce a concentrated ammoniacal nickel ammine carbonate solution containing from about 50 to about 150 g.p.l. of dissolved nickel, preferably about 70–80 g.p.l. nickel. The purpose of this step is twofold: Firstly, to provide a concentrated nickel ammonium carbonate system suitable for subsequent treatment in the reduction step, and secondly, to obtain maximum dissolution of nickel with minimum dissolution of impurities such as magnesium, silica, aluminum, iron, manganese, calcium, etc. It is essential, in order to obtain rapid and substantially complete redissolution of the initial basic nickel carbonate precipitate, to conduct the dissolution in two stages. The preferred procedure is a two-stage countercurrent leach. In the first stage, the $NH_3/Ni$ molar ratio is adjusted to between about 5.0 and 8.0 and the $CO_2/Ni$ ratio between about 1.5 and 3.0, and leaching is continued, usually for a period of less than 2 hours, to obtain about 80–90 percent dissolution of the basic nickel carbonate. The first stage solution is then separated from the residue and the residue subjected to a second stage leach in fresh ammonia-ammonium carbonate solution to substantially completely dissolve the remaining basic nickel carbonate. The undissolved residue containing magnesium, aluminum, silica and other impurities is then separated from the leach-end solution.

Preferably the oxidation of sulfur contaminates to sulphate form is carried out in the concentrated solution after separation of the undissolved residue. In this operation the solution is heated in a pressure vessel, such as an autoclave, to a temperature within the range of 150° to 500° F., preferably at about 200°–250° F., and contacted with a free-oxygen bearing gas such as air, oxygen enriched air or pure oxygen under a partial pressure of oxygen between about 5 and about 20 p.s.i. This treatment is continued as long as is required to convert all sulphur values in the solution to sulfate form—usually about 5–60 minutes.

The oxidized, solids-free nickel ammonium carbonate solution is passed to a second boiling operation wherein it is heated to adjust the carbon dioxide content to between about 0.03 to 2.5 moles of carbon dioxide for each mole of nickel and the ammonia content to between about 0.03 and 6.0 moles of ammonia per mole of nickel present. This adjustment results in the reprecipitation of at least a part of the nickel from solution as a basic nickel compound, thus, the adjusted system comprises a slurry of basic nickel compound precipitate in ammonium carbonate solution.

If sulphur contaminants are not oxidized after the second boiling operation, it is necessary to treat the adjusted slurry in a high-temperature oxidation step. In this step, the slurry of basic nickel compound and solution is charged into a pressure vessel, such as an autoclave, and is heated to a temperature within the range of 150° to 500° F., preferably from about 300° to 475° F. The slurry is contacted with an oxygen bearing oxidizing gas, such as air, oxygen enriched air or oxygen, supplied at a rate sufficient to maintain a partial pressure of oxygen above about 5 p.s.i., preferably between about 10 and 20 p.s.i. These operating conditions are maintained until substantially all sulphur in the form of unsaturated compounds, such as $S_2O_3^{--}$ and $S_3O_6^{--}$ are oxidized to sulphates. Generally, this requires from about 15 minutes to about 120 minutes.

The slurry containing oxidized sulphur values is next treated directly in the hydrogen reduction step wherein the nickel content of the system is reduced to elemental form. The reducing reaction can be conducted within the broad conditions generally known and described in the prior art and particularly in U.S. Pat. No. 2,734,821. The reduction is carried out at a temperature within the range of about 175° to about 600° F., preferably 300°-400° F., under a partial pressure of hydrogen within the range of from about 100 to about 500 p.s.i.

The reducing reaction is self-nucleating; that is, no seed or catalyst is required to initiate or promote the direct reduction of the basic nickel compound to elemental nickel. However, seed in the form of submicron nickel powder and a reduction catalyst such as anthraquinone may be added if desired to reduce the total retention time required to effect substantially complete reduction of the nickel carbonate. The reduction is complete when the consumption of hydrogen ceases, usually from about 15 to about 45 minutes under preferred operation conditions. Precipitated nickel, substantially free from sulphur and other contaminating impurities, is separated from the reaction vessel, and after washing and drying, is ready for the market.

The following example illustrates the use of the present invention in conjunction with an overall process for extracting nickel from nickel- and cobalt-bearing lateritic ore.

EXAMPLE 1

The ore treated analyzed as follows: (% by weight)

| Ni | 1.31 tf al. | | 2.0 |
|---|---|---|---|
| Co | 0.21 | Cr | 2.1 |
| Fe | 49.5 | Cu | 0.01 |
| S | 0.31 | Si | 2.5 |
| mg. | 0.68 | Ignition Loss | 12.0 |
| Mn | 1.0 | Balance | oxygen |

After grinding the screen analysis (Standard Tyler mesh) was: +−6.2%, −65+100−2.0%, −100+150−1.5%, −150+200−2.7%, −200+325−0.1%, −325−87.5%, The ground ore was roasted under reducing conditions in a six hearth Herreshoff furnace. The furnace was heated with radiant tubes installed in hearths No. 4 and No. 5. The temperature distribution within the furnace was as follows: Hearth No. 3–950° F., Hearth No. 4–1,200° F., Hearth No. 5–1,200° F., Hearth No. 6–650°A F. The laterite ore was fed into the furnace continuously at a feed rate of 100 lbs./hr. The retention time within the furnace was about 50 minutes, with the ore being in the 1,200° F. temperature zone for about 24 minutes. Reducing gas, consisting of 75 percent by weight hydrogen and 25 percent by weight nitrogen, was continually fed into the furnace at a rate equivalent to 3.2 cubic feet of gas per pound of dry ore.

Following reduction, the reduced ore was discharged through a cooling zone and quenched in water. Analysis of the reduced ore showed that substantially all the nickel and cobalt and 7 percent of the iron originally present in the ore had been reduced to the metallic state.

The quenched ore was then slurried in recycle leach liquor containing 4.89 g.p.l. nickel, 0.22 g.p.l. cobalt, 50 g.p.l. of carbon dioxide and 72 g.p.l. of total ammonia. (by "total" ammonia is meant both free ammonia and ammonia in compound form). The resultant slurry had a 30 percent solids content. The slurry was heated to about 110° F. and leaching was carried out over a period of 8 hours with continuous sparging of the slurry with air. Following leaching the slurry was subjected to a liquid-solid separation by decantation. The leach liquor recovered contained 8.5 g.p.l. of nickel and 0.78 g.p.l. of cobalt, which corresponds with nickel and cobalt extractions of 90.5 percent and 68 percent by weight respectively.

The free ammonia content of the decanted leach liquor was adjusted to about 50 g.p.l. and the leach liquor was then treated with ammonium sulphide to precipitate a mixed nickel and cobalt sulphides product. Ammonium sulfide solution containing 104 g.p.l. of $S^{--}$ (enough to give a $S^{--}$ to cobalt molar ratio of 3.5) was added to the leach liquor over a period of 12 minutes at room temperature under mild agitation with exclusion of air. Agitation was continued for 5 minutes after all the ammonium sulphide solution had been added to the leach liquor. The resultant mixed nickel and cobalt sulphides were allowed to settle and the solution was then decanted. (Analysis of the solid, washed mixed sulphides showed a nickel to cobalt weight ratio of 1.1:1).

Analysis of the leach liquor following the sulphides precipitation step showed that the nickel to cobalt molar ratio had been increased from 11:1 to 6,970:1 and the nickel to copper ratio from 85:1 to 50,000:1. The solution contained 1.1 g.p.l. of sulphur and small amount of other contaminants including Fe, Mn, Mg and Si.

The cobalt and copper stripped nickel ammonium carbonate solution was steam boiled to precipitate substantially all of the nickel from solution in the form of basic nickel carbonate. The precipitated basic nickel carbonate, which contained 2.5 percent by weight sulphur, was washed in hot water and then rewashed in a solution containing 5 g.p.l. of sodium carbonate. The so-washed precipitate, which contained 0.83 percent by weight sulphur, was redissolved by leaching in two stages in fresh ammoniacal ammonium carbonate solution. The final solution contained 92 g.p.l. dissolved nickel and has an ammonia to nickel molar ratio of 4:1 and a carbon dioxide to nickel molar ratio of 2:1.

The solids-free solution was again stem boiled to remove $NH_3$ and $CO_2$ to precipitate the nickel from solution as basic nickel carbonate and the resulting slurry was charged into a high-pressure autoclave and heated to 400° F. The slurry was agitated and contacted with oxygen gas under a partial pressure of oxygen of 20 p.s.i. This treatment was continued for 1½ hours.

The slurry was then adjusted so that the $NH_3/Ni$ and $CO_2/Ni$ molar ratios were about 4:1 and 2.5:1 respectively and the so-adjusted slurry was reacted with hydrogen at a temperature of 325° F. and under a hydrogen partial pressure of 400 p.s.i. The reduction reaction was complete in about 40 minutes. The product was a high purity elemental nickel powder containing 0.0038 percent by weight sulphur and less than 0.001 percent Mg, Mn and Si.

For purposes of comparison, a sample of leach solution from example 1 was processed in the same manner as described in example 1 except that the high-temperature oxidation step was omitted. The final nickel powder product contained 0.028 percent by weight sulphur. In another comparative test, the same procedure was followed except that the treatment with sodium carbonate was omitted. The nickel powder product obtained after redissolution, reprecipitation, oxidation and direct reduction contained 0.4 percent by weight sulphur.

EXAMPLE 2

In this example, leach solution obtained in the manner outlined in example 1 was treated as described in example 1 except that 5 g.p.l. of sodium carbonate was added to the leach solution prior to the first boiling step and the basic nickel carbonate precipitate was washed with warm water only. The basic nickel carbonate so obtained contained 0.15 percent by weight sulphur. The nickel powder product obtained by redissolution, reprecipitation, oxidation and reduction as described in example 1 contained 0.0037 percent by weight sulphur.

EXAMPLE 3

In this example, the procedure outlined in example 1 was followed except that the basic nickel carbonate precipitated from the leach solution contained only 1 percent sulphur and the treatment with sodium carbonate was omitted. The nickel powder product obtained after redissolution, oxidation, reprecipitation and reduction contained 0.018 percent sulphur.

It will be understood, of course, that modifications can be made in the preferred embodiment of the present invention as described hereinbelow without departing from the scope and purview of the appended claims.

What we claim as new and desire to protect by Letters Patent of the United States is:

1. In the process for recovering nickel from nickel bearing aqueous ammoniacal ammonium carbonate leach solution from which substantially all cobalt and copper have been stripped but which contain sulphur and other impurities including magnesium and silica, the improved method for obtaining the nickel content in elemental form substantially free from sulphur and other impurities which comprises heating the solution in a first boiling step to drive off ammonia and carbon dioxide to precipitate nickel from solution as basic nickel carbonate; separating basic nickel carbonate precipitate from the leach solution; redissolving the basic nickel carbonate precipitate in two stages in an aqueous ammoniacal ammonium carbonate solution to produce a concentrated ammoniacal nickel ammonium carbonate solution containing about 50 to about 150 g.p.l. dissolved nickel; separating undissolved solids containing magnesium, silica and other said impurities from the resulting concentrated solution; contacting the solids-free solution from the redissolution step with a free-oxygen-bearing, oxidizing gas at a partial pressure of oxygen at least 5 p.s.i. and at a temperature within the range of 150° to 500° F. for a period of time sufficient to ensure that substantially all sulphur values in the solution are oxidized to sulphate form; heating the oxidized solution in a second boiling step to adjust the ammonia/nickel molar ratio within the range of from about 0.03:1 to 6:1 and the carbon dioxide/nickel molar ratio within the range of from about 0.03:1 to 2.5:1 to precipitate basic nickel compound from said solution; and reacting the suspension from the second boiling step with hydrogen at elevated temperature and pressure to produce substantially pure elemental nickel.

2. The process according to claim 1 in which concentrated solution is passed directly to the second boiling step after separation of undissolved solids, and slurry from said boiling step is contacted with a free-oxygen-bearing, oxidizing gas at a partial pressure of oxygen of at least 5 p.s.i. and at a temperature within the range of 400°–475° F. for a period of time sufficient to ensure that substantially all sulphur values in the slurry are oxidized to sulphate form.

3. The process according to claim 1 including the step of providing from about 2 to about 20 g.p.l. of at least one member selected from the group consisting of sodium carbonate, sodium hydroxide and sodium bicarbonate in the leach solution prior to the first boiling step whereby sulphate ions in the solution are tied up and remain in solution as sodium sulphate.

4. The process according to claim 1 including the step of washing the basic nickel carbonate precipitated in the first boiling step with an aqueous solution containing 2–20 g.p.l. of at least one member selected from the group consisting of sodium carbonate, sodium hydroxide and sodium bicarbonate whereby insoluble basic sulphate compounds in the precipitate are converted to sodium sulphate which is separated from the precipitate with the wash water.

5. The process according to claim 1 wherein the end solution from the first boiling step is contacted with a sulphiding agent after separation of the basic nickel carbonate precipitate to precipitate substantially all nickel values from said end solution and the resulting precipitate is recovered from said end solution.

* * * * *